INVENTOR.
WAYLAND R. MILLER
BY
ATTORNEY.

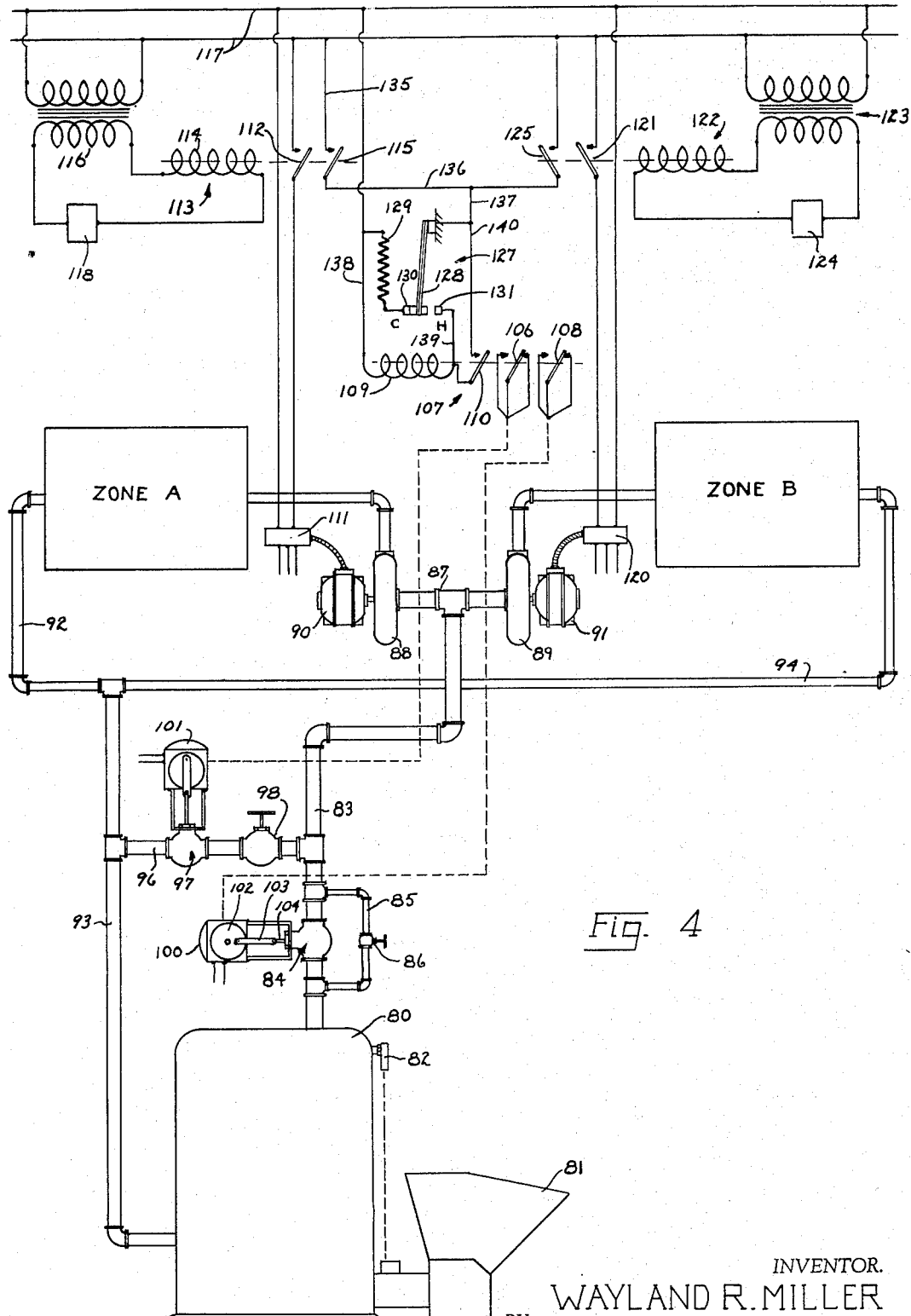

Patented June 18, 1946

2,402,177

UNITED STATES PATENT OFFICE 2,402,177

CONTROL SYSTEM

Wayland R. Miller, Whitefish Bay, Wis., assignor to Perfex Corporation, Milwaukee, Wis., a corporation of Wisconsin Application August 3, 1942, Serial No. 453,381

5 Claims. (Cl. 236—1)

This invention relates in general to automatic control systems, and more particularly to temperature control systems of the two-stage type.

The primary object of this invention is the provision of a simple and dependable two-stage type control system which is especially adapted to control heating systems or other types of conditioning systems.

Other objects will appear from the following description and the appended claims.

For a full disclosure of the invention, reference is made to the following detailed description and to the accompanying drawings, in which Fig. 1 diagrammatically illustrates one form of application of the invention to a gas-fired warm air heating unit which is adapted to supply heated air to a building;

Fig. 4 is a diagrammatic illustration of the invention applied to a zoned hot water heating system.

Figure 1:
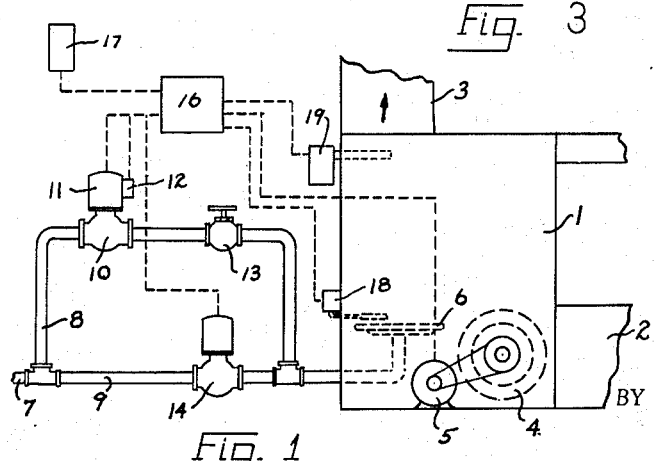

Referring to Fig. 1, reference character 1 indicates a warm air furnace having an inlet or cold air duct 2, an outlet or warm air duct 3 and a fan 4 for circulating air through the heating system of which the furnace 1 forms a part. The fan or circulating means 4 is preferably driven by a two-speed electric motor 5. The furnace is fired by means of a gas burner 6 which is supplied with gas by a conduit 7, this conduit having a branched portion including parallel branches 8 and 9. The branch 8 includes a valve 10 actuated by a suitable motor 11. This valve also is provided with an auxiliary switch 12 which is arranged to close when the valve opens and to open when the valve closes. The branch 8 also includes a manual throttling valve 13 which serves to limit the amount of gas which can flow through this branch. The branch 9 includes a second motorized valve 14 which may be identical with the valve 10. The fan 5 and the valves 10 and 14 are controlled by a control unit 16. This control unit is connected to a thermostat 17 which may be located in the space heated by the furnace 1. The control unit 16 is also connected to a suitable pilot switch 18 and to a bonnet control 19. The bonnet control is preferably of the so-called combination type, which includes a pair of switches actuated by a thermal element responsive to the heated air temperature, one switch being closed when the bonnet temperature rises to a predetermined low value, and the other switch being opened when the bonnet temperature rises to a predetermined high value.

Figure 2:
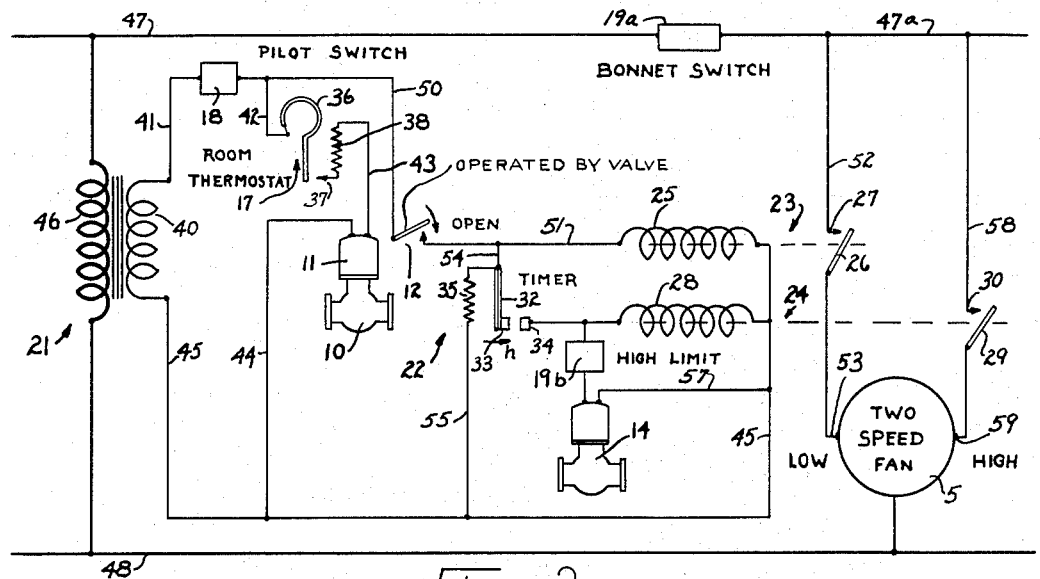
Fig. 2 is a schematic wiring diagram for the controls shown in Fig. 1.

Referring now to Fig. 2, this figure shows the wiring diagram of the control system in Fig. 1. Located in the control unit 16 are a transformer 21, a thermo-electric timer 22, a low speed relay 23, and a high speed relay 24. The relay 23 serves as a means for placing the circulating means into operation at low capacity. This relay may be of usual form and is illustrated as including a coil 25 which actuates a switch arm 26 cooperating with a contact 27. When the coil 25 is energized, the switch arm 26 engages contact 27. However, when coil 25 is deenergized, the switch arm 26 becomes disengaged from the contact as shown. The relay 24 serves as a selective means for causing the two-stage circulating means to operate at low or high capacity. This relay may be identical with the relay 23, and includes a coil 28 for actuating a switch arm 29 cooperating with contact 30. The timer 22 may be of any suitable form. Preferably this timer is of the thermo-electric type and is diagrammatically illustrated as including a bimetal element 32 which is fixed at its upper end and which carries a contact 33 at its lower end, this contact cooperating with a stationary contact 34. The timer 22 also includes an electric heating element 35 which is located so as to heat the element 32. When the heater 35 is deenergized, the element 32 becomes cold and assumes the position shown in which contact 33 is disengaged from contact 34. When element 35 is energized, it slowly heats the bimetal element 32, causing it to warp to the right, thus causing contact 33 to approach contact 34. After a predetermined period of time, the contact 33 will engage contact 34.

The room thermostat 17 is preferably of the heater type such as shown in the Lindemann Patent 2,250,135. This thermostat is illustrated diagrammatically as including a bimetal element 36 adapted to engage or disengage contact 37, an electric heater 38 being located adjacent the bimetal for heating the same when the contacts are closed.

With the parts in the positions shown, the thermostat 17 is satisfied, as indicated by the contacts being open. At this time the valves 10 and 14 and the relays 23 and 24 are deenergized. Thus no gas is supplied to the burner, and also the fan 5 is stationary. Also at this time the heater 35 of timer 22 is deenergized and the bimetal element 32 is in its cold position in which contacts 33 and 34 are disengaged.

When the thermostat calls for heat, the valve motor 11 is energized as follows: from secondary 40 of transformer 22, wire 41, pilot switch 18, wire 42, thermostat 17 (including heater 38), wire 43, valve motor 11 and wires 44 and 45 to the other side of secondary 40. It will be noted that the primary 46 of the transformer 21 is connected across line wires 47 and 48. Energization of the valve motor 11 will cause the valve 10 to open and supply gas to the burner 6 through the branch 8 of the gas supply pipe. When the valve 10 opens, the auxiliary switch 12 attached thereto closes. This establishes an energizing circuit for the relay coil 25 as follows: transformer secondary 40, wire 41, pilot switch 18, wire 50, auxiliary switch 12, wire 51, coil 25 and wire 45 to secondary 40. Energization of coil 25 causes the switch arm 26 to engage contact 27. This completes a circuit from the line wire 47a through wire 52 to the low speed terminal 53 of the fan motor 5. However the fan does not operate at this time due to the bonnet switch 19a being open. When the furnace heats up, due to the operation of the gas burner 6 at low flame, the bonnet switch 19a closes and the fan operates at low speed.

The thermostat 17 is preferably adjusted so that the heater 38 causes the contacts to open after an operating period of about 7 minutes if the room temperature is at the thermostat control point. In other words, if the room temperature is at the value which caused closing of the thermostat contacts, the heater 38 will impart sufficient heat to bimetal element 36 so as to cause the contacts to reopen after an operating period of 7 minutes. The timer 22 is adjusted so as to require a longer period, such as 10 minutes. It will be noted that the timer heater 35 is connected to the wire 51 by wire 54, and is connected to the ground wire 45 by wire 55. Thus the timer heater 35 is energized continuously while the valve 10 is open.

If the room temperature is at the control point of the thermostat, the burner will operate at low flame and the fan will operate at low speed for a period of about 7 minutes, at which time the contacts of room thermostat 17 open and deenergize valve motor 11 and relay 23. Inasmuch as the timer 22 is set for a longer period, the valve 14 and the relay 24 will not be energized. Thus the furnace will be operated intermittently at low capacity, that is low flame and low fan speed, for maintaining the room temperature constant. Due to the furnace operating at low capacity, only a small amount of heat is imparted to the building with each furnace operation. As a result, overshooting in temperature is avoided, even in mild weather. Also, the burner operations will be fairly frequent even in mild weather, and thus stratification of air in the building is avoided.

If the heating load on the system increases, the short operations of the furnace at low capacity will be insufficient to maintain the space temperature at the desired value. Thus the space temperature will fall slightly, which increases the rate of heat dissipation from the room thermostat 17. This increases the time that is required for the heater 38 to reopen the thermostat contacts. Thus the thermostat now instead of opening its contacts after a 7 minute firing interval, will require a longer time. When this timing becomes greater than the timing of timer 22, the timer contacts 33 and 34 will close. This will energize the valve 14 as follows: from wire 51, bimetal element 32, contacts 33—34, high limit switch 19b, valve 14 and wire 57 to wire 45. Closure of contacts 33—34 also establishes a parallel circuit through the relay coil 28, thus causing the switch arm 29 to engage contact 30. This completes a circuit from the line wire 47a through wire 58 to the high speed terminal 59 of fan motor 5, and thus causes the fan to operate at high speed. Thus when the room temperature falls slightly, due to increased heating load, the cycling time of thermostat 17 is increased, which keeps the furnace operating for a period longer than the timing of timer 22, this causing the timer to open valve 14 and energize the relay 24. This causes the burner 6 to operate at high flame and also causes the fan to operate at high speed. The furnace will now operate at high capacity until the thermostat 17 becomes satisfied. When this occurs, the valve motor 11 will be deenergized, thus causing the valve to close. When the valve 10 closes, the auxiliary switch 12 opens, which deenergizes relays 23 and 24, and also deenergizes valve 14. Valve 14 therefore closes and the fan stops. Due to the fan stopping, and due to the valve 14 being closed irrespective of the timer, there is no tendency for the room temperature to overshoot.

It will be noted that the timer heater 35 is deenergized when the room thermostat is satisfied, this being caused by opening of the auxiliary switch 12 and valve 10. Preferably the timer 22 is designed so as to have a substantial cooling time. Thus if the room temperature is below the thermostat control point which causes the thermostat 17 to call for heat after a short period, the timer 22 will still retain some of its residual heat and as a result will close its contacts after a shorter period of operation. For example, now instead of the timer 22 requiring ten minutes to close, it may require a much shorter period, such as 2 minutes. If the "off" period of the thermostat 17 is still shorter, the timer 22 may still have its contacts closed when the room thermostat calls for heat and thus cause instantaneous operation of the furnace at high capacity. The timer 22 thus serves to select between high and low capacity in accordance with the duration of the "on" and "off" periods of the thermostat, the timer serving to provide only low capacity furnace operations if the "on" periods are short, and to provide burner operations at high capacity if the "on" periods are long and the "off" periods short.

Figure 3:
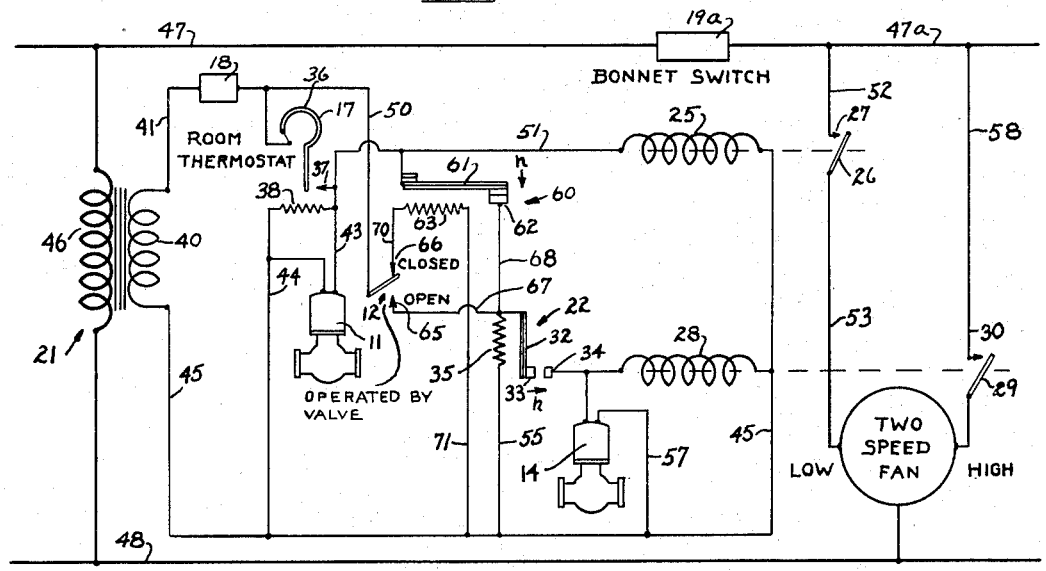
Fig. 3 is a schematic wiring diagram of a modified form of control system.

Referring to Fig. 3, this figure shows the same general control system as shown in Fig. 2. However, in Fig. 3 an additional timer 60 is provided for maintaining the furnace in operation for at least a predetermined time after each call for heat by the thermostat. This timer is shown as including a bimetal element 61 which is stationary at one end and which carries a contact at its other end, this contact cooperating with a stationary contact 62. The bimetal element 61 is subjected to the influence of an electric heater 63. When the heater 63 is energized, the bimetal element 61 assumes the position shown in which the contacts are closed. When heater 63 is deenergized the element 60 begins cooling, and after a predetermined interval, such as 7 minutes, the contacts separate. In this embodiment of the invention the electric heater 38 of the room thermostat 17 is preferably wired in parallel with the valve motor 11, instead of in series as shown in Fig. 2. Also in Fig. 3 auxiliary switch 12 is of the double contact type, having a lower stationary contact 65 which is engaged when the valve is open, and also having an upper stationary contact 66 which is engaged when the valve is closed.

When the room thermostat calls for heat it completes a circuit to the valve motor 11 as follows: from secondary 40 of transformer 21, wire 41, pilot switch 18, bimetal element 36, contact 37, wire 43, valve motor 11, wire 44 and wire 45 to secondary 40. The thermostat heater 38 is simultaneously energized by a circuit in parallel with the valve motor 11 as shown. Engagement of the thermostat contact 17 also energizes the relay coil 25 through wire 51. This causes the fan to operate at low speed when the bonnet switch 19a closes, as in Fig. 2.

When the valve 11 opens, the switch arm of the auxiliary switch 12 engages contact 65, which establishes an energizing circuit for the timer heater 35 as follows: secondary 40, wire 41, pilot switch 18, wire 50, contact 65, wire 67, heater 35, wire 55 and wire 45 to secondary 40. Thus the timer heater 35 will be energized when valve 11 is open and cause the bimetal element 32 to begin warping toward contact closed position. Engagement of contact 65 of the auxiliary switch 12 will also establish a maintaining circuit through the timer 60, this maintaining circuit serving to keep the valve 11 open irrespective of the room thermostat 17. This circuit may be traced as follows: from contact 65, wire 67, wire 68, contact 62, bimetal element 61, wire 51 and wire 43 to valve motor 11. At this time the heater 63 will be deenergized due to the auxiliary switch arm having disengaged contact 66. Thus the bimetal element 61 will begin cooling and after a period of time will cause the timer contacts to disengage for breaking the maintaining circuit. This arrangement insures against any possible short cycling of the thermostat and thus insures that each firing period of the furnace will be sufficiently long in duration to obtain efficient operation. After valve 11 closes due to opening of the contacts of thermostat 17 and opening of the contacts of timer 60, the auxiliary switch blade will disengage contact 65 and engage contact 66. This will energize the heater 63 through wires 70 and 71. Thus the bimetal element of the timer will heat for causing the timer contacts to again close. While the timer 60 is illustrated as of the type which times by cooling, if desired this timer may be one which times by heating, similar to the timer 22. In such case the wire 70 would be connected to the contact 65 of auxiliary switch 12.

With the exception of the minimum "on" period feature provided by the timer 60, the system of Fig. 3 operates in exactly the same manner as the system of Fig. 2. Thus on initial call for heat by the room thermostat the valve 11 is opened immediately and the valve 14 remains closed thus causing the burner to operate at low capacity. If the call for heat by the thermostat is shorter than the timing period of timer 60, the valve 14 will not close when the thermostat opens its contacts but will remain open until the timer 60 breaks the holding circuit. If the call for heat is of sufficient duration for timer 22 to act, then valve 14 is opened for causing the burner to operate at high capacity. When this happens, the holding circuit through timer 60 is usually broken as the timing period of timer 60 is shorter than the timing period of timer 22. Thus when the thermostat contacts close, valve 11 opens immediately, this acting through switch 12 to cause opening of valve 14. If the contacts of timer 60 happen to be still closed when the thermostat contacts open, both valves 11 and 14 will remain open until the minimum firing period provided by timer 60 expires, at which time both valves will close.

Figure 4

Referring to Fig. 4, this figure illustrates a typical application of the invention to a zoned hot water heating system. In this figure, reference character 80 indicates a hot water boiler which may be fired by a stoker 81, this stoker being controlled by a thermostat 82 responsive to the boiler temperature. This thermostat serves to control the stoker so as to maintain a substantially constant boiler water temperature. Leading from the boiler is a hot water supply line 83, this line having interposed therein a motorized two-position type valve 84, a by-pass 85 being connected across the valve 84 and being provided with a manual throttling valve 86. The supply line 83 is branched at 87 and is connected to circulators 88 and 89 which are driven by electric motors 90 and 91 respectively. The circulator 88 serves to supply hot water to a radiation system indicated as zone A, this system being connected by return pipes 92 and 93 to the inlet of boiler 80. The circulator 89 serves to supply hot water to the radiation system indicated as zone B, this system being connected by a return line 94 to the return main 93. A by-pass conduit 96 is interposed between the supply line 83 and the return line 93. This by-pass is provided with a two-position type motorized valve 97 and a throttling hand valve 98.

The valves 84 and 97 are provided with two-position type motors 100 and 101 respectively. The motor 100 drives a crank disc 102 which actuates a pitman 103 connected to valve stem 104. The motor 101 is controlled by a single pole, double-throw switch 106 forming part of a relay generally indicated as 107. The motor 100 is similarly controlled by a second single pole, double-throw switch 108, which also forms part of relay 107. The relay 107 also includes a coil 109 and a maintaining switch 110. When the coil 109 is deenergized, the switches assume the positions shown. This causes the valve motor 100 to assume the position shown in which valve 84 is closed, and causes the valve motor 101 to assume the position shown in which the valve 97 is open. If the circulator 88 is now placed into operation it will draw water from the boiler 80 through the by-pass 85 and pipes 83 and 87, this water being circulated through zone A and being returned to the boiler through pipes 92 and 93. At the same time the circulator will recirculate water through the by-pass conduit 96 due to the valve 97 being open. Thus water will flow from the zone A through pipes 92, 93, 96, 83 and 87 to zone A. Thus when the circulator 88 is operating, a relatively small quantity of hot water will be taken from the boiler 80 and will be mixed with the relatively large volume of water recirculated through the by-pass 96. As a result the water now circulated through zone A will be relatively cool and thus low in heat exchange effectiveness. By adjusting manual valves 86 and 98, the relative proportions of the heated and recirculated water may be varied, this providing for adjustment of the temperature of the water circulated through the radiation system. It will be apparent that if the circulator 89 is operated, water will be circulated through zone B in the same manner as through zone A above described.

If the coil 109 of the relay 107 is energized, the relay switches 106 and 108 will be shifted to their other positions, this causing the valve motor 100 to open valve 84, and causing the valve motor 101 to close the valve 97. With the valves in these positions, all of the water supplied to either of the two radiation systems will be circulated through the boiler 80, thus causing the water supply to be of high temperature and thus be of high heat exchange effectiveness. The relay 107 and the motorized valves thus constitute a means for selectively operating the system on low or high stages of heat exchange effectiveness.

The motor 90 for circulator 88 is controlled by a motor starter 111 which is in turn controlled by a switch 112 forming a part of relay 113 having a coil 114. The relay 113 also includes a switch 115. This relay is energized from the secondary 116 of a transformer having its primary connected across the line wires 117. The coil 114 is connected in circuit with a suitable heat demand responsive device 118, which may be a thermostat responsive to the temperature of the space heated by the radiation zone A. The motor 91 for circulator 89 is similarly controlled by a motor starter 120 which is controlled by a switch 121 forming a part of a relay 122. This relay is energized from a transformer 123 and is controlled by a thermostat 124 responsive to the temperature of the space heated by the radiation zone B. Relay 122 also includes a switch 125.

The switches 115 and 125 of the relays 110 and 122 control the relay 107 and a timer 127. The timer 127 may include a bimetal element 128 which is subjected to the influence of an electric heater 129. This bimetal element is shown as fixed at its upper end and when in its cold position engages a stationary contact 130. When the bimetal element 128 is heated to a predetermined temperature it disengages the contact 130 and engages a second stationary contact 131. Preferably a suitable snap action mechanism is associated with the timer 127 for causing the element 128 to snap from contact 130 to contact 131.

With the parts in the positions shown, both thermostats 118 and 124 are satisfied and the relays 113 and 122 are deenergized. The circulators 88 and 89 are thus at rest and no water is being circulated through either heating zone. Also the bimetal element 127 is in its cold position wherein it engages contact 130. Due to the relay 107 being deenergized, the valve 84 is closed and the valve 97 is open. If one of the thermostats, such as thermostat 118, calls for heat, it will energize the relay 113, thus causing the relay switches 112 and 115 to close. Closure of the relay switch 112 completes a circuit from the line wires 117 through the motor starter 111, and thus places the circulator motor 90 into operation. As a result water is circulated through zone A. Due to the valve 84 being closed and the valve 97 being open, the water circulated through zone A consists of a small portion of hot water from the boiler 80 and a large portion of recirculated water, and thus the radiators of zone A are relatively cool in temperature.

Simultaneously with the starting of the circulator motor 90, the relay 113 energizes the heater 129 of timer 127 as follows: from one line wire 117, wire 135, relay switch 115, wire 136, wire 137, bimetal element 128, contact 130, heater 129 and wire 138 to the other line wire 117. The timer 127 is adjusted so that it will not cause contact 131 to be engaged until after a period which is longer than the normal operating period of thermostat 118 when the space temperature is at the control point thereof. Thus when the operation of the system on its low stage is sufficient to maintain the space temperature at the thermostat control point, the thermostat 118 will deenergize relay 113 and stop the circulator 90 before the timer will move to its hot position. Thus the space temperature will be kept constant by intermittently operating the system at its low stage of heat exchange effectiveness, this avoiding overshooting in space temperature and also providing for frequent operating periods to eliminate stratification.

If operation of the system at its low stage is insufficient to maintain the space temperature, the space temperature will fall slightly, thus increasing the length of the "on" periods provided by thermostat 118. When these "on" periods exceed the timing period of timer 127, the bimetal element 128 will be heated sufficiently to cause disengagement of contact 130 and engagement of contact 131. This will establish a starting circuit for relay coil 109 as follows: from one line wire 117, wire 135, relay switch 115, wire 136, wire 137, bimetal element 128, contact 131, wire 139, coil 109, and wire 138 to the other line wire 117. Energization of the relay 107 will cause the relay switches 106 and 108 to assume their opposite positions in which they cause the valve 84 to open and the valve 97 to close, thus placing the system on its high stage of heat exchange effectiveness. This operation will continue until the room thermostat becomes satisfied, at which time it deenergizes relay 113 which stops the circulator 88. It should be noted that when the bimetal element 128 disengages contact 130 for engaging contact 131, the circuit through heater 129 is broken, thus permitting the element 128 to begin cooling. This element may disengage contact 131 and re-engage contact 130 before the operating period of the system terminates. This, however, will not affect the relay 107, which is now held in by a maintaining circuit including wire 140 and the relay switch 110. This maintaining circuit is in parallel with the starting circuit through timer contact 131, and thus keeps the relay 107 energized independently of the timer, once this relay is energized.

If the thermostat 124 for zone B calls for heat instead of the thermostat 118 of zone A, it places the circulator 89 in operation for circulating water through the zone B. The control of the timer 127 and the relay 107 by relay 122 is exactly the same as the control of these devices by the relay 113. Thus if either thermostat calls for heat for a predetermined length of time, the water circulated through the zone will be changed from relatively cool to relatively hot, thereby permitting the system to carry the heating load.

The arrangement of the timer 127 so that it begins cooling immediately after placing the system on high stage operation, is advantageous where the system supplies a number of zones. For example, if zone A for some reason should be too cold and require operation of the system at its second stage while zone B is at proper temperature, the system will usually not supply extremely hot water to zone B when its thermostat calls for heat. Thus during the operating period for zone A, the timer 127 will begin cooling and will reach its cold position shortly after the thermostat 118 becomes satisfied. At this time the circuit for the coil 109 is opened by opening of the relay switch 115 and thus the relay 107 assumes the position shown in which the maintaining circuit is open, and in which the valves 84 and 97 are returned to their low stage positions. Now if the thermostat 124 for zone B calls for heat, the system will be operated on its low stage instead of its high stage, as would occur if the timer 127 had not been permitted to cool while zone A was operating on its high stage.

From the foregoing description it will be apparent that the present invention provides a very simple and dependable form of two-stage control and which does not require any complicated or delicate two-stage thermostats. While the invention is of particular utility in controlling heating systems, its application is not limited thereto. It will be apparent that the principles of the invention are equally applicable in control of cooling systems or other types of condition changing systems. Inasmuch as many variations and adaptations may be made without departing from the scope of the invention, it is desired to be limited only by the scope of the appended claims.

What is claimed is:

1. In a zoned heating system having a pair of zones supplied by a common source of heat, each zone having a separate circulator for circulating heating fluid therethrough, the combination of, selective means associated with the source of heat for selectively supplying relatively cool or relatively warm heating fluid, a thermostat for each zone for starting and stopping the circulator of its associated zone, a timer controlled conjointly by said thermostats, said timer being operable in response to a prolonged call for heat to actuate said selective means to cause relatively warm heating fluid to be supplied to said zones.

2. In a zoned heating system having a pair of zones supplied by a common source of heat, each zone having a separate circulator for circulating heating fluid therethrough, the combination of, selective means associated with the source of heat for selectively supplying relatively cool or relatively warm heating fluid, a thermostat for each zone for starting and stopping the circulator of its associated zone, a timer comprising a thermostatic element and electric heating means therefor in control of said selective means, said timer having a first position which causes said selective means to supply relatively cool heating medium and having a second position which causes the selective means to supply relatively warm heating medium, means for controlling said electric heating means in a manner to cause the timer to move from its first position to its second position a period of time after either circulator is placed into operation, and means actuated upon movement of the timer from its first position for controlling said heating means in a manner tending to cause return movement of the timer to said first position.

3. In a temperature changing system for a space, the combination of, mechanical circulating means for circulating a temperature changing fluid in heat exchange relationship with a space, temperature changing means for changing the temperature of said fluid, temperature control means for controlling the temperature of the circulated fluid, said temperature control means having a first position causing the temperature of the fluid to be of relatively low heat exchange effectiveness and having a second position causing the temperature of the fluid to be of higher heat exchange effectiveness, a thermostat responsive to the temperature of the space arranged to start and stop the mechanical circulating means, a timer comprising a thermostatic element and electric heating means therefor in control of said temperature control means, said timer having a first position which causes the temperature control means to assume its first position and having a second position which causes the temperature control means to assume its second position, means for controlling said electric heating means in a manner to cause the timer to move from its first position to its second position a period of time after the circulating means is placed into operation, and means actuated upon movement of the timer from its first position for controlling said heating means in a manner tending to cause return movement of the timer to said first position.

4. In a two-stage conditioning system, the combination of, a condition changer adapted selectively to operate at a low rate or a high rate, a first control means having an "on" position causing operation of the condition changer and having an "off" position tending to place the condition changer out of operation, a second control means having a "low" position in which it causes the condition changer to operate at the low rate when in operation and having a "high" position tending to cause operation of the condition changer at the high rate, a two-position type condition responsive controller arranged to respond to the condition changed by the condition changer, said controller assuming a first position when a change in condition is required and assuming a second position when the condition responsive controller is satisfied, means causing said first control means to assume its "off" position when the controller is satisfied and to assume its "on" position when change in the condition is required, a slow acting timer controlled by said condition responsive controller for controlling said second control means, said slow acting timer moving a period of time after the controller calls for change in the condition from an initial position which causes the second control means to be in its "low" position to another position which causes the second control means to be in its "high" position, and means actuated upon movement of the timer from its initial position tending to cause return movement thereof to its initial position.

5. In a two-stage conditioning system, the combination of, a condition changer adapted selectively to operate at a low rate or a high rate, means including a two-position type condition responsive controller for controlling said condition changer and arranged to start and stop the same, means including a slow-acting timer for controlling the rate at which the condition changer operates, said timer moving a period of time following starting of the condition changer from an initial position in which the condition changer operates at low rate to another position in which the condition changer operates at high rate, and means actuated upon movement of the timer from its initial position tending to cause return movement thereof to its initial position.

WAYLAND R. MILLER.